United States Patent [19]

Roewer et al.

[11] Patent Number: 5,716,590

[45] Date of Patent: Feb. 10, 1998

[54] CATALYTIC HYDRODEHALOGENATION OF HALOGEN-CONTAINING COMPOUNDS OF GROUP IV ELEMENTS

[75] Inventors: Gerhard Roewer; Uwe Paetzold; Holger Walter, all of Freiberg, Germany

[73] Assignee: Wacker-Chemie GmbH, Munich, Germany

[21] Appl. No.: 352,224

[22] Filed: Dec. 8, 1994

[30] Foreign Application Priority Data

Dec. 17, 1993 [DE] Germany ............ 43 43 169.0

[51] Int. Cl.$^6$ ............ C01B 33/02; C01B 33/08; C07C 17/25; C07F 7/14
[52] U.S. Cl. ............ 423/342; 423/350; 556/466; 556/467; 556/475; 570/101; 570/156; 570/230
[58] Field of Search ............ 556/466, 467, 556/475; 570/101, 156, 230; 423/349, 350, 342

[56] References Cited

U.S. PATENT DOCUMENTS

| | | | |
|---|---|---|---|
| 2,615,925 | 10/1952 | Bordner | 570/156 |
| 2,628,243 | 2/1953 | Barry et al. | 556/466 |
| 2,697,124 | 12/1954 | Mantell | 570/156 |
| 2,704,775 | 3/1955 | Clark | 570/156 |
| 2,864,873 | 12/1958 | Miller et al. | 570/156 |
| 3,864,281 | 2/1975 | Ohorodnik et al. | |
| 4,500,724 | 2/1985 | Ward, III et al. | |

FOREIGN PATENT DOCUMENTS

| | | | |
|---|---|---|---|
| 255877 | 2/1988 | European Pat. Off. | |
| 459463 | 12/1991 | European Pat. Off. | 570/156 |
| 3448237 | 2/1985 | Germany | |
| 117333 | 4/1992 | Japan | 570/156 |
| 117334 | 4/1992 | Japan | 570/156 |
| 9138 | 1/1993 | Japan | 570/156 |
| WO 91/05752 | 5/1991 | WIPO | |

OTHER PUBLICATIONS

J.W., Mellor, *A Comprehensive Treatise on Inorganic and Theoretical Chemistry,* vol. VI (1947), R, cont, Longmans, Green and Co., pp. 211–214.

Kirk–Othmer, Encyclopedia of Chem. Techn., 3rd Edition, vol. 20, pp. 846–854 and 925–928, J. Wiley & Sons, NY, 1982.

Bott et al., Proc. Chem. Soc., Oct. 1962, p. 337.

Methoden der Organischen Chemie (Methods of Organic Chemistry), Mueller Ed., vol. V/3, p. 497, G. Thieme Verlag Stuttgart, 1962.

Methoden der Organischen Chemie (Methods of Organic Chemistry), Mueller Ed., vol. IV/1c, pp. 364–368, G. Thieme Verlag Stuttgart, 1980.

Roempp Chemie Lexikon (Roempp's Chemical Encyclopedia), Falbe et al. Eds., 9th Edition, p. 4163, G. Thieme Verlag Stuttgart.

*Primary Examiner*—Wayne Langel
*Attorney, Agent, or Firm*—Collard & Roe, P.C.

[57] ABSTRACT

Catalytic dehalogenation (or hydrodehalogenation) of halogen-containing compounds of elements of group IV of the periodic table in the presence of hydrogen is carried out using a finely-dispersed catalytically active material which comprises silicon and at least one transition metal, and which is characterized by high catalytic activity and stability. This process can be used, for example, for synthesizing compounds or alternatively for decomposing halogen-containing compounds, for instance in waste-water or waste-gas purification processes. It is also suitable for dehalogenation (hydrodehalogenation) of halogen-containing silane compounds, for instance of silicon tetrachloride or alkyl trichlorosilane compounds, and the original purity of the silanes used as starting materials is retained by the products. Tetrachlorosilane, for example, can be converted into trichlorosilane.

29 Claims, No Drawings

CATALYTIC HYDRODEHALOGENATION OF HALOGEN-CONTAINING COMPOUNDS OF GROUP IV ELEMENTS

BACKGROUND OF THE INVENTION

This invention relates to a process for catalytic hydrodehalogenation of halogen-containing compounds of elements of group IV of the periodic table in the presence of hydrogen.

As used herein, the term "hydrodehalogenation" refers to elimination or removal of halogen atoms. In carbon compounds, hydrogen is substituted for the halogen atom, or a double bond is formed. C—C bonds or other element-element bonds may be broken. With higher homologs of carbon, e.g., silicon compounds, usually a substitution reaction occurs.

The hydrodehalogenation of halogen-containing compounds of elements of the fourth main group of the periodic table, in particular carbon and silicon, in the presence of hydrogen is a process with which corresponding halogen-containing compounds can be reacted, firstly with the aim of synthesizing corresponding compounds having a lower halogen content, and secondly with the aim of breaking down halogen-containing compounds or facilitating further chemical or biological breakdown, for instance in waste gas or waste water purification processes. Catalysts used in the past have proved to be not very stable, and also may be dangerous to handle; for example, Raney nickel, which catalyses hydrodehalogenation is difficult to produce and dangerous to handle. It also is not possible to reactivate the spent catalyst.

SUMMARY OF THE INVENTION

It is the object of the present invention to provide an improved process for catalytic hydrodehalogenation of halogen-containing compounds of elements of group IV of the periodic table in the presence of hydrogen.

Another object of the invention is to provide a regeneratable catalyst system which is capable of catalyzing hydrodehalogenation of halogen-containing compounds of elements of group IV of the periodic table.

These and other objects of the invention are achieved by providing a process for catalytic hydrodehalogenation of a halogen-containing compound of a group IV element, comprising contacting the compound in the presence of hydrogen with a catalytically active material comprising silicon and at least one transition metal at a temperature sufficient to induce catalytic hydrodehalogenation.

In accordance with a further aspect of the invention, the objects are also achieved by providing a catalytically active particulate material comprising silicon and at least one transition metal which forms a silicide, said material consisting of particles having particle diameters of less than 1 mm, and said material catalyzing hydrodehalogenation of halogen-containing compounds of group IV elements in the presence of hydrogen at temperatures in the range from 100 to 1,000° C.

DETAILED DESCRIPTION OF THE PREFERRED EMBODIMENTS

The process of the present invention for catalytic hydrodehalogenation of halogen-containing compounds of elements of group IV of the periodic table in the presence of hydrogen is characterized in that a catalytically active system comprising silicon and at least one transition metal is used as catalyst. The term "element of group IV of the periodic table" refers to elements which fall in the same column with carbon in the periodic table of elements, and in particular to carbon and silicon. The term "transition metal" preferably relates to those transition metals which are capable of forming silicides. Catalytically active systems composed of silicon and at least one metal selected from the group consisting of nickel, copper, iron, cobalt, molybdenum, palladium, platinum, rhenium, cerium and lanthanum are particularly preferred within the scope of the invention. Of course, catalytically active systems which are formed of silicon and two or more of the aforementioned transition metals can also be used. A catalytically active system composed of silicon and nickel is particularly preferred.

The atomic ratio of metal to silicon is advantageously in the range from 100:1 to 1:100, preferably from 20:1 to 1:20. In catalytically active systems of nickel and silicon, those systems having an atomic ratio of nickel to silicon of from 2:1 to 3:2 are particularly active, and likewise systems having an atomic ratio of nickel to silicon of about 1:1 to 1:2 are particularly catalytically active. While applicants do not wish to be bound to any theory of why the described systems described are catalytically active, it is believed that metal-silicide phases are formed. For systems comprising nickel and silicon, these include, for example, $Ni_2Si$, $Ni_3Si_2$, $NiS$ or $NiS_2$ phases. Any metal which is present in excess, and in particular silicon, can increase the life of the catalyst systems.

Catalytically active systems which are considered mixed silicides, such as active systems comprising nickel, copper and silicon, can also be used. Mixtures of the pure metals and their silicides can also be used. Transition metal compounds such as halides or carbides (e.g. $NiCl_2$ or $Ni_3C$) may also be constituents of the catalytically active system. Preferably the catalytically active system is in shaped form, e.g. it is pressed into pellets or tablets and wherein a carrier material as support of the catalytically active material is absent.

It has been found, for example in hydrodechlorination of R113 to $CF_2=CFCl$, that catalyst substances containing excess silicon are stable for a long time even at low temperatures. Under these experimental conditions, the hydrodechlorination of R113 preferentially occurs as mentioned above. The long-term stability is observed, for example, in catalytically active systems which contain nickel and silicon in the form of nickel silicide, and excess silicon. In such catalysts, the atomic ratio of metal (e.g. nickel) to silicon may be less than 1.

The molar ratio of hydrogen to the halogen atoms which are to be eliminated or removed can vary over a wide range. Advantageously, from 1 to 20 molecules of $H_2$ are used per halogen atom which is to be cleaved. If complete hydrodehalogenation is desired, it is advantageous to operate in the upper range, and if partial hydrodehalogenation is intended, one advantageously operates in the lower range.

The process can be performed at a pressure below ambient pressure, a pressure above ambient pressure or preferably at ambient pressure (1 atmosphere). The process is advantageously carried out continuously in a through-flow apparatus.

One preferred embodiment of the invention relates to the use of halogen-containing compounds of carbon. This embodiment will be explained below.

The process according to the invention for converting halogen-containing carbon compounds into carbon compounds having a reduced halogen content or, in the case of complete hydrodehalogenation, into halogen-free carbon compounds, can be applied in many different ways. For instance, the process can be used to synthesize hydrocarbons or halogenated hydrocarbons which, in turn, can be used as such or as intermediates for further synthesis. This is particularly advantageous if the process according to the invention is carried out in the course of recycling of a polyhalogenated starting material. In this way, starting materials which can no longer be used further or which is not permitted to be used further, can be converted into valuable products. In particular, fully-halogenated carbon compounds may be converted into carbon compounds which contain hydrogen and optionally halogen, or which may comprise a double bond, and substitutes for fully halogenated carbon compounds can be produced in this manner.

However, the process of the invention can be used advantageously even when the feed material is not intended for recycling; the reduction of the halogen content facilitates the breakdown of the respective feed material in other subsequent conversion processes. For instance, poorly combustible or completely incombustible polyhalogenated or fully-halogenated carbon compounds can be converted into more readily combustible or oxidizable or incineratable carbon compounds with a lower halogen content or halogen-free hydrocarbon compounds.

Of course, the process is particularly advantageous when used on compounds which are in the vapor or gaseous state at the respective reaction temperature, but the process is not restricted to such compounds. Saturated or unsaturated compounds may be used which are composed of halogen, carbon and optionally hydrogen. Compounds with hetero atoms such as oxygen or nitrogen may likewise be used, as can compounds with other hetero atoms, provided that the catalytically active system is not unacceptably deactivated. This can be determined by small-scale tests.

The process is particularly suitable for use on saturated or unsaturated carbon compounds with 1 to 20 carbon atoms which contain halogen and optionally hydrogen. The following classes of compounds can be hydrodehalogenated particularly well: chloro(hydro) carbon compounds, fluoro(hydro) carbon compounds, chlorofluoro(hydro) carbon compounds and the bromine-containing derivatives thereof, in particular with 1 to 20 carbon atoms, particularly preferably with 1 to 7 carbon atoms.

The hydrodehalogenation, especially hydrodechlorination and hydrodefluorination, is usually carried out in a temperature range of from 100° to 1000° C. The optimum temperature thereby naturally varies for individual compounds, and also depends on process parameters, e.g. on the space velocity with respect to the catalyst. The optimum temperature also has to be matched to the desired degree of hydrodehalogenation. The optimum temperature and the optimum process parameters can be determined by small-scale tests, in which for instance the temperature and/or the space velocity is varied and the reaction product or the mixture of reaction products is analyzed.

If partial hydrodehalogenation is intended, one operates in the lower temperature range. If for instance carbon compounds are used which contain two or more chlorine atoms, a partial hydrodehalogenation is usually achieved in the temperature range from 100° to 600° C. and complete hydrodehalogenation in the temperature range from 200° to 1000° C.

In order to partially hydrodefluorinate carbon compounds which contain at least two fluorine atoms, one operates at a temperature of from 100° to 700° C., and in order to achieve complete hydrodefluorination one should operate at a temperature in the range from 300° to 1000° C.

For example, at reaction temperatures below 350° C. carbon tetrachloride yields partially hydrogenated products, and above 350° C. methane is produced, i.e. complete hydrodehalogenation takes place. When a catalytically active system comprising nickel and silicon is used, 1,1,2-trichloro-1,2,2-trifluoroethane (R113) reacts in the process according to the invention at temperatures of 300° C. and above. Upon reaction in the range of 400° to 450° C., a plurality of products are formed, inter alia $CF_2=CFCl$. Without being bound to any explanation for the formation of this unsaturated product, it is believed that initially a chlorine atom is replaced by hydrogen and then HCl is eliminated. The resulting $CF_2=CFCl$ is a valuable intermediate product for chemical synthesis and for the production of polymers. Complete hydrodehalogenation of R113 occurs at temperatures of 450° C. and above. The reaction is particularly selective for the formation of $CF_2=CFCl$ if there is an excess of silicon in the catalytically active system. The catalytic system then also has long-term stability.

Polymeric compounds may also be used as starting materials in the process of the invention. If, for instance, polyvinyl chloride is used, hydrochloric acid and a monomer are formed. Similar considerations apply to the use of polytetrafluoroethylene, but not until higher temperatures, i.e. from 550° C. upwards.

Another preferred embodiment of the invention relates to use of the process on compounds which contain silicon, in which there is at least one silicon-halogen bond, preferably at least one silicon-chlorine bond. An especially preferred feed material for this embodiment of the invention is halogen-containing silanes corresponding to the formula $R_xSiCl_{4-x}$ or halogen-containing disilanes corresponding to the formula $R_yCl_{3-y}Si-SiR_zCl_{3-z}$, in which R represents chlorine, alkyl with 1 to 6 carbon atoms or phenyl and x, y and z are whole numbers, with x being 0 to 3, y being 0 to 3 and z likewise being 0 to 3, with the proviso that at least one chlorine atom must be present in the silanes or disilanes. If two or more radicals R are present on a molecule, these may have the same meaning or different meanings. The process according to the invention is particularly well suited for the synthesis of hydrogen-containing silanes or disilanes. It is particularly suitable for obtaining $SiHCl_3$ from $SiCl_4$. However, for example, methyl dichlorosilane can also be produced from methyl trichlorosilane.

The exchange of chlorine for hydrogen in silanes or disilanes, in particular in the production of $SiHCl_3$, preferably takes place in the temperature range from 200° to 1000° C. The particular advantage of this embodiment of the process according to the invention is that, unlike other processes, the original purity of the starting materials is retained. For this reason, the process according to the invention is very particularly suitable in the production of ultra-pure silicon using trichlorosilane ($SiHCl_3$). In this procedure for producing ultra-pure silicon, the trichlorosilane is disproportionated, and highly pure $SiCl_4$ is produced as a by-product, which can be hydrodehalogenated according to the process of the invention. The resulting $HSiCl_3$ can be recycled to the process for producing ultra-pure silicon.

The catalytically active system may be produced, if desired, by mixing finely-dispersed particles (particle diameter<1 mm) of the metal in question or of a salt of the metal or the metals in question and silicon. Preferably the catalytically active system is produced in situ. For this purpose, transition metal or a corresponding salt, a hydrogen-containing and/or halogen-containing Si compound, e.g. a silicon halide, and hydrogen may be reacted. It is particularly advantageous to react finely-dispersed transition metal with $SiCl_4$ and hydrogen. Elemental silicon is then separated, which forms the catalytically active system with the finely-dispersed transition metal. Alternatively, the silicon compound can be partially or entirely replaced by elemental silicon. If desired, the resulting active system can be formed into desired shapes, for instance pressed into tablets, or one may start with shaped starting material.

It has been found that the catalytically active system can be regenerated by reaction with elemental silicon or hydrogen-containing and/or halogen-containing silicon compounds, e.g. $SiCl_4$ and hydrogen. This takes place practically continuously if $SiHCl_3$ is produced from $SiCl_4$. Also, in the hydrodehalogenation of halogen-containing carbon compounds, $SiCl_4$ can be continuously or intermittently admixed with the starting material, or can be passed through the catalytically active system in order to regenerate it.

If desired, the catalytically active system may comprise conventional ceramic carriers or supports.

The invention also relates to a finely-dispersed, catalytically active system comprising silicon and at least one transition metal, which system is capable of catalyzing hydrodehalogenation of halogen-containing compounds of elements of group IV of the periodic table. The preferred transition metals include nickel, copper, iron, cobalt, molybdenum, palladium, platinum, rhenium, cerium and lanthanum. Transition metals which are especially preferred are nickel and copper. Preferably the catalytically active system is formed of particles having a size of<1 mm. If desired, the catalytically active system may comprise conventional ceramic supports such as silicon dioxide, silicon carbide or low-aluminum or aluminum-free zeolites. Preferably it is in shaped form, in particular pressed into shaped bodies such as tablets.

A preferred process for producing such a finely-dispersed catalytically active system is characterized in that a transition metal or transition metal salt, which is present in finely-dispersed form, is reacted with hydrogen-containing and/or halogen-containing silicon compounds, preferably silicon halogen compounds, especially $SiCl_4$, and a reducing agent, in particular hydrogen.

In accordance with an alternate embodiment for producing the finely-dispersed catalytically active system, the silicon compound which is used (e.g. $SiCl_4$) is partially or entirely replaced by elemental silicon.

Preferred embodiments, for instance in terms of the atomic ratio of metal to silicon, correspond to the embodiments described as being preferred in the preceding description of the process of use.

In the past, transition metal silicides have been used merely as high-temperature materials and ceramic materials, for cermets and hard metals, as semiconductors, as heating resistor material and for producing highly-non-scaling layers for surface compaction. The use of such material as a catalyst for chemical reactions, in particular hydrogenation processes, is novel and likewise a subject of this invention.

The hydrodehalogenation process according to the invention has the advantage that the catalytically active system is very stable, very active and permits the production of, for instance, even ultra-pure silicon-hydrogen compounds. The catalytically active system, which can be regenerated in simple manner, converts the starting materials, in particular silicon compounds, into highly-pure products.

The following examples are intended to illustrate the invention in greater detail, without restricting its scope.

EXAMPLE 1

Production of a finely-dispersed catalytically active system comprising silicon and nickel.

1.1. Finely-dispersed nickel (2+)chloride and silicon powder were reacted with silicon tetrachloride in the presence of $H_2$ (molar ratio 1:4) at a temperature of 450° C. The resulting catalytically active system (atomic ratio Ni:Si=1:1) was pressed into tablet form and used as a hydrogenation catalyst.

1.2. Example 1.1. was repeated with finely-dispersed nickel instead of $NiCl_2$. The resulting catalyst could be used as a hydrogenation catalyst.

EXAMPLE 2

Hydrogenation of 1,1,2-trichloro-1,2,2-trifluoroethane (R113).

A bed of 10 g of the catalytically active system produced according to Example 1.1. was heated in a reactor, and R113 and hydrogen (molar ratio in the range from 1:6 to 1:10) were passed therethrough at a flow rate of 10 liters/hour. The reaction started in the bed from a temperature of 300° C. upwards. At a temperature of 400° to 450° C., $CF_2=CFCl$ and low-boiling compounds were detected in the reaction product. At a temperature above 450° C., complete decomposition occurred with formation of HF, HCl, $SiF_4$ and $CH_4$.

EXAMPLE 3

Hydrogenation of $CCl_4$.

A bed of 10 g of the catalytically active system produced according to Example 1.1. was reacted in a reactor with a mixture of $CCl_4$ and hydrogen (molar ratio 1:6) (throughput flow rate 10 liters/hour). At a reaction temperature below 350° C., partially hydrogenated products ($CHCl_3$, $CH_2Cl_2$, $CH_3Cl$) were also detected in the reaction product. At reaction temperatures above 350° C., the $CCl_4$ was completely hydrogenated to methane.

EXAMPLE 4

Production of $SiHCl_3$ (trichlorosilane).

4.1. A bed of 10 g of the catalytically active system produced in Example 1.1. was reacted in a reactor with a mixture of $SiCl_4$ and hydrogen (molar ratio 1:10) at a temperature of 600° C. (throughput flow rate 10 liters/hour). The conversion was 16 mole percent; this value approaches the maximum which is thermodynamically possible. A highly-pure product was produced from the highly-pure starting material.

4.2. Example 4.1. was repeated. $SiCl_4$ and hydrogen were used in a molar ratio of 1:4, with the throughput rate being increased from 6 liters/hour to 100 liters/hour. The temperature was 900° C. This time, the conversion was 25 mole percent, virtually the maximum which is thermodynamically possible. A highly-pure product was produced from the highly-pure starting material.

EXAMPLE 5

Hydrogenation of methyl trichlorosilane to methyl dichlorosilane.

A bed of 10 g of the catalytically active system produced according to Example 1.1. was reacted in a reactor with a mixture of $CH_3SiCl_3$ and hydrogen (molar ratio 1:10, throughput flow rate 10 liters/hour) at a temperature above 600° C. The conversion in terms of the reaction product methyl dichlorosilane was 75 mole percent. The MeSiHCl$_2$ which was produced was of high purity.

EXAMPLES 6 to 10

Examples 2, 3, 4.1., 4.2. and 5 were repeated using the catalyst system produced in Example 1.2, and analogous results were obtained.

EXAMPLE 11

Hydrodechlorination of R113.

A bed of 10 g of the catalytically active system produced analogously to Example 1.1 (except that a molar ratio Ni:Si of 1:10 was used) was heated in a reactor, and R113 and hydrogen (molar ratio 1:10) were passed therethrough at a flow rate of 10 liters/hour. The reaction at 400° C. yielded CF$_2$=CFCl and HCl as reaction products. The excess of silicon in the catalyst improved the long-term stability of the catalyst.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for catalytic hydrodehalogenation of a halogen-containing compound of carbon or silicon, said process comprising contacting said compound in the presence of hydrogen with a catalytically active material comprising (1) elemental silicon and at least one transition metal or comprising (2) a transition metal silicide, at a temperature sufficient to induce catalytic hydrodehalogenation; and wherein a carrier material as support of the catalytically active material is absent.

2. A process according to claim 1, wherein said halogen-containing compound is a halogen-containing carbon compound with from 1 to 20 carbon atoms.

3. A process according to claim 2, wherein said halogen-containing carbon compound is selected from the group consisting of chlorocarbon compounds, chlorohydrocarbon compounds, fluorocarbon compounds, fluorohydrocarbon compounds, chlorofluorocarbon compounds, chlorofluorohydrocarbon compounds and bromine-containing derivatives thereof.

4. A process according to claim 1, wherein said halogen-containing compound is a chlorine-containing carbon compound and said temperature is in the range from 100° to 1,000° C.

5. A process according to claim 4, wherein said chlorine-containing carbon compound contains at least two chorine atoms, and said chlorine-containing carbon compound is partially hydrodechlorinated at a temperature in the range from 100 to 600° C.

6. A process according to claim 4, wherein said chlorine-containing carbon compound is fully hydrodechlorinated at a temperature in the range from 200° to 1000° C.

7. A process according to claim 1, wherein said halogen-containing compound is a fluorine-containing carbon compound, and said fluorine-containing compound is hydrodefluorinated at a temperature in the range from 100° to 1,000° C.

8. A process according to claim 7, wherein said fluorine-containing carbon compound contains at least two fluorine atoms, and said fluorine-containing carbon compound is partially hydrodefluorinated at a temperature in the range from 100° to 700° C.

9. A process according to claim 7, wherein said fluorine-containing carbon compound is fully hydrodefluorinated at a temperature in the range from 300° to 1,000° C.

10. A process according to claim 1, wherein said halogen-containing compound is SiHCl$_3$, and the SiHCl$_3$ is reacted to produce ultra-pure silicon.

11. A process according to claim 1, wherein said catalytically active material is a transition metal silicide which is produced in situ.

12. A process according to claim 1, wherein at least one siliceous substance selected from the group consisting of elemental silicon, hydrogen-containing silicon compounds and halogen-containing silicon compounds, is introduced into the hydrodehalogenation.

13. A process according to claim 12, wherein SiCl$_4$ is continuously introduced into the hydrodehalogenation.

14. A process according to claim 1, wherein from 1 to 20 molecules of H$_2$ are present per halogen atom which is to be cleaved off from the halogen-containing compound.

15. A process according to claim 1, wherein said process is carried out at ambient pressure.

16. A process according to claim 1, wherein said catalytically active material comprises silicon and at least one metal selected from the group consisting of nickel, copper, iron, cobalt, molybdenum, palladium, platinum, rhenium, cerium and lanthanum.

17. A process according to claim 1, wherein the catalytically active material comprises elemental silicon and at least one transition metal, and the elemental silicon and the transition metal react in situ to form a transition metal silicide.

18. A process for catalytic hydrodehalogenation of a chlorine-containing silane corresponding to the formula

or a chlorine-containing disilane corresponding to the formula

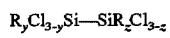

in which R represents chlorine, alkyl with 1 to 6 carbon atoms or phenyl, and x, y and z are each individually 0, 1, 2, or 3, said process comprising contacting said chlorine-containing silane or disilane in the presence of hydrogen with a catalytically active material comprising (1) elemental silicon and at least one transition metal or (2) a transition metal silicide, at a temperature sufficient to induce catalytic hydrodehalogenation; and wherein a carrier material as support of the catalytically active material is absent.

19. A process according to claim 18, wherein said halogen-containing compound is SiCl$_4$, and HSiCl$_3$ is produced.

20. A process for catalytic hydrodehalogenation of a halogen-containing compound of carbon or silicon, said process comprising contacting said halogen-containing compound in the presence of hydrogen with a catalytically active material comprising a transition metal silicide, at a temperature sufficient to induce catalytic hydrodehalogenation, wherein said catalytically active material is produced in situ by reacting particles of a transition metal or a transitional metal compound with hydrogen and at least one siliceous substance selected from the group consisting of elemental silicon, hydrogen-containing silicon compounds and halogen-containing silicon compounds; said particles having particle diameters of less than 1 mm; and wherein a carrier material as support of the catalytically active material is absent.

21. A process for catalytic hydrodehalogenation of a halogen-containing compound of carbon or silicon, said process comprising contacting said compound in the presence of hydrogen with a catalytically active material comprising (1) elemental silicon and at least one transition metal or comprising (2) a transition metal silicide, at a temperature sufficient to induce catalytic hydrodehalogenation; and wherein said transition metal is selected from the group consisting of nickel, copper, iron, cobalt, molybdenum, rhenium, cerium and lanthanum.

22. A process according to claim 21, wherein said catalytically active material comprises silicon and nickel.

23. A process according to claim 22, wherein the nickel and the silicon are present in an atomic ratio of Ni to Si of 2:1 to 3:2.

24. A process for catalytic hydrodehalogenation of a chlorine-containing silane corresponding to the formula

or a chlorine-containing disilane corresponding to the formula

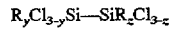

in which R represents chlorine, alkyl with 1 to 6 carbon atoms or phenyl, and x, y and z are each individually 0, 1, 2, or 3, said process comprising contacting said chlorine-containing silane or disilane in the presence of hydrogen with a catalytically active material comprising (1) elemental silicon and at least one transition metal or (2) a transition metal silicide, at a temperature sufficient to induce catalytic hydrodehalogenation; and wherein said transition metal is selected from the group consisting of nickel, copper, iron, cobalt, molybdenum, rhenium, cerium and lanthanum.

25. A process according to claim 24, wherein said catalytically active material comprises silicon and nickel.

26. A process according to claim 25, wherein the nickel and the silicon are present in an atomic ratio of Ni to Si of 2:1 to 3:2.

27. A process for catalytic hydrodehalogenation of a halogen-containing compound of carbon or silicon, said process comprising contacting said halogen-containing compound in the presence of hydrogen with a catalytically active material comprising a transition metal silicide, at a temperature sufficient to induce catalytic hydrodehalogenation, wherein said catalytically active material is produced in situ by reacting particles of a transition metal or a transitional metal compound with hydrogen and at least one siliceous substance selected from the group consisting of elemental silicon, hydrogen-containing silicon compounds and halogen-containing silicon compounds; said particles having particle diameters of less than 1 mm; and wherein said transition metal is selected from the group consisting of nickel, copper, iron, cobalt, molybdenum, rhenium, cerium and lanthanum.

28. A process according to claim 27, wherein said catalytically active material comprises silicon and nickel.

29. A process according to claim 28, wherein the nickel and the silicon are present in an atomic ratio of Ni to Si of 2:1 to 3:2.

* * * * *